United States Patent
Anzai (10) Patent No.: US 10,301,450 B2
(45) Date of Patent: May 28, 2019

(54) TIRE (71) Applicant: BRIDGESTONE CORPORATION, Chuo-ku, Tokyo (JP)

(72) Inventor: Hiroyuki Anzai, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 15/522,286

(22) PCT Filed: Oct. 5, 2015

(86) PCT No.: PCT/JP2015/078233
§ 371 (c)(1),
(2) Date: Apr. 27, 2017

(87) PCT Pub. No.: WO2016/067842
PCT Pub. Date: May 6, 2016

(65) Prior Publication Data
US 2017/0313847 A1 Nov. 2, 2017

(30) Foreign Application Priority Data
Oct. 27, 2014 (JP) .................................. 2014-218405

(51) Int. Cl.
*B60C 1/00* (2006.01)
*C08K 3/36* (2006.01)
*C08L 77/00* (2006.01)
*C08K 5/5419* (2006.01)
*C08K 5/544* (2006.01)
(Continued)

(52) U.S. Cl.
CPC .............. *C08K 3/36* (2013.01); *B60C 1/0041* (2013.01); *B60C 5/01* (2013.01); *C08K 5/5419* (2013.01); *C08K 5/5442* (2013.01); *C08K 5/5455* (2013.01); *C08L 77/00* (2013.01)

(58) Field of Classification Search
CPC .................................................... B60C 1/0041
See application file for complete search history.

(56) References Cited

U.S. PATENT DOCUMENTS

2014/0194562 A1   7/2014 Matsuura
2015/0051332 A1   2/2015 Koda et al.
(Continued)

FOREIGN PATENT DOCUMENTS

JP   2002-363189 A   12/2002
JP   2003-104005 A   4/2003
(Continued)

OTHER PUBLICATIONS

English machine translation of Fueda et al. (WO 2009/093695); generated Jan. 22, 2018.*
(Continued)

*Primary Examiner* — Michael F Pepitone
(74) *Attorney, Agent, or Firm* — SOLARIS Intellectual Property Group, PLLC (57) ABSTRACT

A tire comprising a tire frame that is formed of a resinous material and has a circular form, the resinous material including a thermoplastic polyamide-based elastomer, silica, and a silane coupling agent that has a functional group, the functional group including at least one selected from the group consisting of a nitrogen atom, a carboxyl group, an acid anhydride, and a ureido group.

7 Claims, 3 Drawing Sheets

(51) Int. Cl.
  *C08K 5/5455* (2006.01)
  *B60C 5/01* (2006.01)

(56) References Cited

U.S. PATENT DOCUMENTS

2016/0053097 A1    2/2016  Koda et al.
2018/0162645 A1*   6/2018  Takano ................ B32B 25/04

FOREIGN PATENT DOCUMENTS

| | | |
|---|---|---|
| JP | 2005-002065 A | 1/2005 |
| JP | 2009-1718 A | 1/2009 |
| JP | 2009-291962 A | 12/2009 |
| JP | 2011-42774 A | 3/2011 |
| JP | 2013-241609 A | 12/2013 |
| JP | 2014-80478 A | 5/2014 |
| JP | 2014-133829 A | 7/2014 |
| WO | 2009/093695 A1 | 7/2009 |
| WO | WO 2009093695 A1 * | 7/2009 ............. C08L 21/00 |
| WO | 2010/047315 A1 | 4/2010 |
| WO | 2011/027703 A1 | 3/2011 |
| WO | 2014/157145 A1 | 10/2014 |

OTHER PUBLICATIONS

International Search Report issued in International Application No. PCT/JP2015/078233 dated Dec. 15, 2015.
Properties of Epoxy-Phenol Thermosetting Resin Using New Modified Styrene Butadiene Rubber, by authors Shin-ichiro Iwanaga and Takashi Nishioka, vol. 9, No. 2, p. 108-112 (2006) Japan Institute of Electronics Packaging (JIEP)

* cited by examiner

TIRE

CROSS-REFERENCE TO RELATED APPLICATIONS

The present application is a U.S. national stage application of application PCT/JP2015/078233, which was filed Oct. 5, 2015, which claims foreign priority to Japanese Patent Application 2014-218405, which was filed on Oct. 27, 2014. The present application hereby incorporates by reference both applications referenced above.

TECHNICAL FIELD

The present invention relates to a tire fitted onto a rim, and in particular, relates to a tire having a tire case that is at least partially formed of a resinous material.

BACKGROUND ART

Hitherto, pneumatic tires configured from rubber, organic fiber materials, steel members, and the like are employed in vehicles such as passenger automobiles. Ordinary rubber materials employed in conventional pneumatic tires have no issues related to heat tolerance and the like. However, it is common to use plural processes, kneading, seating, molding, and vulcanizing, in the tire manufacturing process, and an increase in productivity is desired.

To cope therewith, in recent years, investigations have been made related to employing resinous materials, especially thermoplastic resins, thermoplastic elastomers, and the like, as tire materials, since these materials are lightweight, easily moldable, and easily recyclable. For example, pneumatic tires molded using thermoplastic polymers have been disclosed by Japanese Patent Application Laid-Open (JP-A) No. 2003-104005 and the like. These thermoplastic polymers (thermoplastic resins) have many merits from the viewpoint of improving productivity, such as that they can be molded by extrusion. Moreover, polyamide-based elastomers and the like are given as examples of the thermoplastic resin.

SUMMARY OF INVENTION

Technical Problem

Reinforcement by a filler such as in an ordinary rubber-made tire is conceivable for improving strength and the like in a tire employing a thermoplastic polymer. For example, JP-A No. 2003-104005 above states that silica (white carbon) may be employed in a resin composition or the like. However, silica is liable to aggregate, and aggregates are liable to form even when blended into a polymer as-is. These aggregates influence tire strength and may prevent tire-strength-improving effects in some cases.

On the other hand, in the field of ordinary rubbers, coupling agents are employed to suppress silica aggregation. However, improving the strength of a resin-made tire is difficult even when a coupling agent for rubber is employed alone in a tire frame that employs silica and a resin such as a polyamide-based elastomer.

In consideration of these particulars, an object of one embodiment of the invention is to provide a tire that is formed using a resinous material and that has excellent strength.

Solution to Problem

[1] A tire comprising a tire frame that is formed of a resinous material and has a circular form, the resinous material comprising: a thermoplastic polyamide-based elastomer; silica; and a silane coupling agent that has a functional group, the functional group comprising at least one selected from the group consisting of a nitrogen atom, a carboxyl group, an acid anhydride, and a ureido group.

Advantageous Effects of Invention

One embodiment of the invention can provide a tire that is formed using resinous material and that has excellent strength.

DESCRIPTION OF EMBODIMENTS

A tire according to an embodiment of the invention has a tire frame, the tire frame being formed of a resinous material and having a circular form. The resinous material includes a thermoplastic polyamide-based elastomer, silica, and a silane coupling agent having a functional group that includes at least one selected from a nitrogen atom, a carboxyl group, an acid anhydride, or a ureido group (sometimes simply referred to as the silane coupling agent in the invention hereafter).

The tire according to an embodiment of the invention enables the strength of the tire to be improved by including a specific silane coupling agent in the resinous material, in addition to the thermoplastic polyamide-based resin elastomer and the silica. In particular, the tire has excellent cracking resistance. This is hypothesized to be because employing the silane coupling agent enables dispersion of silica in the resinous material forming the tire frame to be improved, thereby causing a reinforcing effect to be sufficiently exhibited by the silica. The tire according to an embodiment of the invention has excellent productivity since the tire frame can be molded by extrusion with excellent formability.

In the present specification, the concept of "resin" includes thermoplastic resins and thermocurable resins, but does not include natural rubber.

In the present specification, numerical ranges expressed using "from . . . to . . . " denote ranges that include the values before and after the "to" as the minimum value and the maximum value respectively.

In the present specification, when there are plural substances corresponding to a respective component present in a composition, the amount of the respective component in the composition denotes the total amount of the plural substances present in the composition, unless specifically stated otherwise.

Resinous Material

As described above, the tire according to an embodiment of the invention includes the tire frame that employs the resinous material. The resinous material includes a thermoplastic polyamide-based elastomer, silica, and a silane coupling agent having a functional group that includes at least one functional group selected from a nitrogen atom, a carboxyl group, an acid anhydride, or a ureido group. The resinous material may include thermoplastic elastomers other than the thermoplastic polyamide-based elastomer and may include optional components. A content of the thermoplastic polyamide-based elastomer with respect to the total amount of resinous material is preferably 30% by mass or greater, is more preferably 50% by mass or greater, and is particularly preferably 70% by mass or greater.

Thermoplastic Polyamide-Based Elastomer

In the present specification, "thermoplastic polyamide-based elastomer" refers to a thermoplastic resinous material that is formed of a copolymer, the copolymer including: a polymer which forms a hard segment that is crystalline and has a high melting temperature; and a polymer which forms a soft segment that is amorphous and has a low glass transition temperature, in which the polymer which forms the hard segment has amide bonds (—CONH—) in the main chain thereof.

The thermoplastic polyamide-based elastomer is also sometimes simply referred to as "TPA" (ThermoPlastic Amid elastomer).

Examples of the thermoplastic polyamide-based elastomer include materials with at least a crystalline polyamide component of the hard segment having a high melting temperature, and with another polymer (such as, for example, a polyester, or a polyether) that is amorphous and is a component of the soft segment with a low glass transition temperature. The thermoplastic polyamide-based elastomer may also employ a chain extender, such as a dicarboxylic acid, as a connection portion for the hard segment and the soft segment.

Hard Segment

Examples of the polyamide forming the hard segment include a polyamide synthesized using a monomer represented by Formula (1) or Formula (2) below.

$$H_2N—R^1—COOH \quad \text{Formula (1)}$$

$R^1$ in Formula (1) represents a hydrocarbon molecular chain having from 2 to 20 carbon atoms, or an alkylene group having from 2 to 20 carbon atoms.

Formula (2)

In Formula (2), $R^2$ represents a hydrocarbon molecular chain having from 3 to 20 carbon atoms, or an alkylene group having from 3 to 20 carbon atoms.

The $R^1$ in Formula (1) is preferably a hydrocarbon molecular chain having from 3 to 18 carbon atoms or an alkylene group having from 3 to 18 carbon atoms, is still more preferably a hydrocarbon molecular chain having from 4 to 15 carbon atoms or an alkylene group having from 4 to 15 carbon atoms, and is particularly preferably a hydrocarbon molecular chain having from 10 to 15 carbon atoms or an alkylene group having from 10 to 15 carbon atoms. Moreover, the $R^2$ in Formula (2) is preferably a hydrocarbon molecular chain having from 3 to 18 carbon atoms or an alkylene group having from 3 to 18 carbon atoms, is still more preferably a hydrocarbon molecular chain having from 4 to 15 carbon atoms or an alkylene group having from 4 to 15 carbon atoms, and is particularly preferably a hydrocarbon molecular chain having from 10 to 15 carbon atoms or an alkylene group having from 10 to 15 carbon atoms.

ω-aminocarboxylic acids and lactams are examples of the monomers represented by Formula (1) and Formula (2) above. Moreover, examples of the polyamide that forms the hard segment include condensation polymers of such ω-aminocarboxylic acids and lactams, and condensation copolymers of diamines and dicarboxylic acids.

Examples that may be employed as the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, or 12-aminododecanoic acid. Examples that may be employed as the lactam include aliphatic lactams having from 5 to 20 carbon atoms, such as lauryl lactam, ε-caprolactam, undecane lactam, ω-enantholactam, or 2-pyrrolidone.

Examples that may be employed as the diamine include diamine compounds such as aliphatic diamines having from 2 to 20 carbon atoms, such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, 3-methylpentamethylene diamine, or meta-xylene diamine. Moreover, the dicarboxylic acid may be represented by $HOOC—(R^3)_m—COOH$ ($R^3$: a hydrocarbon molecular chain having from 3 to 20 carbon atoms, m: 0 or 1); for example, an aliphatic dicarboxylic acid having from 2 to 22 carbon atoms, such as oxalic acid, succinic acid, glutaric acid, adipic acid, pimelic acid, suberic acid, azelaic acid, sebacic acid, or dodecanedioic acid.

Examples of the polyamide that forms the hard segment include polyamides (polyamide 6) that are ring-opened polycondensates of ε-caprolactam, polyamides (polyamide 11) that are ring-opened polycondensates of undecane lactam, polyamides (polyamide 12) that are ring-opened condensates of lauryl lactam, polyamides (polyamide 12) that are condensates of 12-aminododecanoic acid, polyamides (polyamide 66) that are condensates of a diamine and a dibasic acid, and polyamides (amide MX) having meta-xylene diamine as a structural unit.

The polyamide 6 may be represented by, for example, ${CO—(CH_2)_5—NH}_n$ (where n represents an arbitrarily selected number of repeating units), and n is, for example, preferably from 2 to 100 and is more preferably from 3 to 50. The polyamide 11 may be represented by, for example, ${CO—(CH_2)_{10}—NH}_n$ (where n represents an arbitrarily selected number of repeating units), and n is, for example, preferably from 2 to 100 and is more preferably from 3 to 50. The polyamide 12 may be represented by, for example, ${CO—(CH_2)_{11}—NH}_n$ (where n represents an arbitrarily selected number of repeating units), and n is, for example, preferably from 2 to 100 and is more preferably from 3 to 50. The polyamide 66 may be represented by, for example, ${CO(CH_2)_4CONH(CH_2)_6NH}_n$ (where n represents an arbitrarily selected number of repeating units), and n is, for example, preferably from 2 to 100, and is more preferably from 3 to 50.

Moreover, the amide MX having meta-xylene diamine as a structural unit may represent, for example, the structural unit (A-1) below (where n in (A-1) represents an arbitrarily selected number of repeating units), and n is, for example, preferably from 2 to 100 and is more preferably from 3 to 50.

(A-1)

The thermoplastic polyamide-based elastomer preferably includes, as the hard segment, a polyamide (polyamide 6) represented by —[CO—(CH$_2$)$_5$—NH]— or a polyamide (polyamide 12) that includes a structural unit represented by —[CO—(CH$_2$)$_{11}$—NH]—. As described above, polyamide 12 can be obtained by a ring-opening polycondensation of lauryl lactam or by a polycondensation of 12-aminododecanoic acid.

Soft Segment

Examples of the polymer that forms the soft segment include polyesters and polyethers, and examples further include polyethylene glycol, polypropylene glycol, polytetramethylene ether glycol (PTMG), and ABA-type triblock polyethers. These may be employed singly, or in a combination of two or more thereof. Moreover, a polyether diamine or the like, obtained via a reaction of ammonia or the like with a terminal unit of a polyether, may be employed. For example, an ABA-type triblock polyether diamine may be employed.

Herein, examples of the "ABA-type triblock polyethers" include a polyether represented by Formula (3) below.

Formula (3)

x and z in Formula (3) each independently represent integers of from 1 to 20. y represents an integer of from 4 to 50.

As the respective values of x and z in Formula (3), integers of from 1 to 18 are preferable, integers of from 1 to 16 are still more preferable, integers of from 1 to 14 are particularly preferable, and integers of from 1 to 12 are most preferable. Moreover, as the value of y in Formula (3), an integer of from 5 to 45 is preferable, an integer of from 6 to 40 is more preferable, an integer of from 7 to 35 is particularly preferable, and an integer of from 8 to 30 is most preferable.

Moreover, examples of the "ABA-type triblock polyether diamines" include polyether diamines represented by Formula (N) below.

Formula (N)

In Formula (N), $X_N$ and $Z_N$ each independently represent an integer of from 1 to 20. $Y_N$ represents an integer of from 4 to 50.

As the respective values of the $X_N$ and the $Z_N$ in Formula (N), integers of from 1 to 18 are preferable, integers of from 1 to 16 are still more preferable, integers of from 1 to 14 are particularly preferable, and integers of from 1 to 12 are most preferable. Moreover, as the value of $Y_N$ in Formula (N), an integer of from 5 to 45 is preferable, an integer of from 6 to 40 is more preferable, an integer of from 7 to 35 is particularly preferable, and an integer of from 8 to 30 is most preferable.

Combinations of the respective hard segments and the soft segments described above are examples of the combination of the hard segment and the soft segment. From among these, a combination of a ring-opening polycondensate of lauryl lactam/polyethylene glycol, a combination of a ring-opening polycondensate of lauryl lactam/polypropylene glycol, a combination of a ring-opening polycondensate of lauryl lactam/polytetramethylene ether glycol, a combination of a ring-opening polycondensate of lauryl lactam/an ABA-type triblock polyether, a combination of a ring-opening polycondensate of lauryl lactam/an ABA-type triblock polyether diamine, a combination of a polycondensate of aminododecanoic acid/polyethylene glycol, a combination of a polycondensate of aminododecanoic acid/polypropylene glycol, a combination of a polycondensate of aminododecanoic acid/polytetramethylene ether glycol, a combination of a polycondensate of aminododecanoic acid/an ABA-type triblock polyether, and a combination of a polycondensate of aminododecanoic acid/an ABA-type triblock polyether diamine are preferable combinations. Moreover, a combination of a ring-opening polycondensate of lauryl lactam/an ABA-type triblock polyether, a combination of a ring-opening polycondensate of lauryl lactam/an ABA-type triblock polyether diamine, a combination of a polycondensate of aminododecanoic acid/an ABA-type triblock polyether, and a combination of a polycondensate of aminododecanoic acid/ABA-type triblock polyether diamine are particularly preferable.

The polymer forming the soft segment may include, as a monomer unit, a diamine such as a branched, saturated diamine having from 6 to 22 carbons, a branched, alicyclic diamine having from 6 to 16 carbons, or a norbornane diamine. Moreover, the branched, saturated diamine having from 6 to 22 carbons, the branched, alicyclic diamine having from 6 to 16 carbons, or the norbornane diamine may each be employed alone, may be employed in a combination thereof, or may be employed in combination with the ABA-type triblock polyether or the ABA-type triblock polyether diamine described above.

Examples of the branched, saturated diamine having from 6 to 22 carbons include 2,2,4-trimethyl-1,6-hexane diamine, 2,4,4-trimethyl-1,6-hexane diamine, 1,2-diaminopropane, 1,3-diaminopentane, 2-methyl-1,5-diaminopentane, and 2-methyl-1,8-diaminooctane.

Examples of the branched alicyclic diamine having from 6 to 16 carbons include 5-amino-2,2,4-trimethyl-1-cyclopentane methylamine and 5-amino-1,3,3-trimethyl cyclohexane methylamine. These diamines may be cis-isomers or trans-isomers, or may be a mixture of these isomers.

Examples of the norbornane diamine include 2,5-norborene dimethylamine, 2,6-norborene dimethylamine, and mixtures of these.

Moreover, the polymer which forms the soft segment may include, as a monomer unit, a diamine compound other than those described above. Examples of other diamine compounds include: aliphatic diamines such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, or 3-methylpentane methylene diamine; alicyclic diamines such as bis(4-aminocyclohexyl)methane, bis(4-aminocyclohexyl)propane, 1,3-bisaminomethylcyclohexane, or 1,4-bisaminomethylcyclohexane; and aromatic diamines such as metaxylylene diamine or paraxylylene diamine.

The diamines above may be employed alone, or may be employed in an appropriate combination of two or more types thereof.

Chain Extender

As described above, in addition to the hard segment and the soft segment, the thermoplastic polyamide-based elastomer may include a connection portion employing a chain extender, such as a dicarboxylic acid. Examples employable as the carboxylic acid include at least one type selected from out of aliphatic, alicyclic, or aromatic dicarboxylic acids, or a derivative thereof.

Specific examples of the dicarboxylic acid include: linear-chain aliphatic dicarboxylic acids having from 2 to 25 carbons such as adipic acid, decane dicarboxylic acid, oxalic acid, succinic acid, glutaric acid, pimelic acid, suberic acid, azelaic acid, sebacic acid, or dodecanedioic acid; aliphatic dicarboxylic acids, such as dimerized aliphatic dicarboxylic acids having from 14 to 48 carbons yielded by dimerizing an unsaturated fatty acid obtained by fractional distillation of a triglyceride, and hydrogen adducts thereof; alicyclic dicarboxylic acids such as 1,4-cyclohexane dicarboxylic acid; and aromatic dicarboxylic acids such as terephthalic acid or isophthalic acid.

Molecular Weight

In the present embodiment, a weight average molecular weight of the thermoplastic polyamide-based elastomer included in the resinous material is from 15,000 to 75,000. Fittability onto a rim and productivity can be improved when the weight average molecular weight of the thermoplastic polyamide-based elastomer is in a range of from 15,000 to 75,000. The weight average molecular weight of the thermoplastic polyamide-based elastomer is preferably from 20,000 to 75,000. The weight average molecular weight of the thermoplastic polyamide-based elastomer may be measured by GPC (gel permeation chromatography), and, for example, a GPC (gel permeation chromatography) system such as an "HLC-8320GPC EcoSEC" manufactured by Tosoh Corporation may be employed.

From the viewpoints of melt-formability, a number average molecular weight of the polymer (polyamide) included in the hard segment is preferably from 300 to 15000. From the viewpoint of toughness and low temperature flexibility, a number average molecular weight of the polymer included in the soft segment is preferably from 200 to 6000.

From the viewpoint of formability, a mass ratio (x:y) of the hard segment (x) to the soft segment (y) in the thermoplastic polyamide-based elastomer is preferably from 50:50 to 90:10, and is more preferably from 50:50 to 80:20.

A content of the hard segment in the thermoplastic polyamide-based elastomer is preferably from 5% by mass to 95% by mass, is more preferably from 10% by mass to 90% by mass, and is particularly preferably from 15% by mass to 90% by mass, with respect to the total content of the thermoplastic polyamide-based elastomer.

A content of the soft segment in the thermoplastic polyamide-based elastomer is preferably from 10% by mass to 95% by mass, is more preferably from 10% by mass to 90% by mass, and is particularly preferably from 10% by mass to 90% by mass, with respect to the total content of the thermoplastic polyamide-based elastomer.

In cases in which a connection portion employing the chain extender is included, a content thereof is preferably set such that there are approximately the same number of moles of hydroxide groups or amino groups of monomers which form the soft segment as there are moles of carboxyl groups of the chain extender.

The thermoplastic polyamide-based elastomer can be synthesized by copolymerizing, using a known method, the polymer which forms the hard segment and the polymer which forms the soft segment. For example, the thermoplastic polyamide-based elastomer can be obtained by polymerizing a monomer which forms the hard segment (for example, an ω-aminocarboxylic acid such as 12-aminododecanoic acid, or a lactam such as lauryl lactam), a monomer which forms the soft segment (for example, the ABA-type triblock polyether or the ABA-type triblock polyether diamine), and the chain extender (for example, adipic acid or decanedicarboxylic acid) in a container. In particular, in cases in which an w-aminocarboxylic acid is employed as the monomer which forms the hard segment, synthesis can be performed by melt polymerization under ordinary pressure, or by melt polymerization under ordinary pressure with a further melt polymerization under reduced pressure. In cases in which a lactam is employed as the monomer which forms the hard segment, an appropriate amount of water may also be present, and the polymer may be produced by a method including melt polymerization under a pressure of from 0.1 MPa to 5 MPa and a subsequent melt polymerization under ordinary pressure and/or melt polymerization under reduced pressure. Moreover, these synthetic reactions may be performed in batches or continuously. In the synthetic reactions described above, a batch-type reactor vessel, a single-vessel or plural-vessel continuous reactor, a tubular continuous reactor, or the like may be employed singly or in an appropriate combination thereof.

In the production of the thermoplastic polyamide-based elastomer, a polymerization temperature is preferably from 150° C. to 300° C., and is more preferably from 160° C. to 280° C. A polymerization time may be appropriately chosen for the relationship between the polymer weight average molecular weight and the polymerization temperature of the thermoplastic polyamide-based elastomer to be synthesized. For example, from 0.5 hours to 30 hours is preferable, and from 0.5 hours to 20 hours is more preferable.

An additive for the purpose of adjusting the molecular weight and stabilizing the melt viscosity during shape-forming/processing may be added in the production of the thermoplastic polyamide-based elastomer if necessary, and examples of the adduct include: monoamines or diamines such as laurylamine, stearylamine, hexamethylene diamine, or metaxylylene diamine; and monocarboxylic acids or dicarboxylic acids such as acetic acid, benzoic acid, stearic acid, adipic acid, sebacic acid, or dodecanedioic acid. These additives may be appropriately chosen for the relationship between molecular weight, viscosity, and the like of the thermoplastic polyamide-based elastomer to be obtained, within a range that will not negatively impact the advantageous effects of the invention.

A catalyst may also be employed in the production of the thermoplastic polyamide-based elastomer, if necessary. Examples of the catalyst include compounds that include at least one selected from the group consisting of P, Ti, Ge, Zn, Fe, Sn, Mn, Co, Zr, V, Ir, La, Ce, Li, Ca, and Hf.

Examples thereof include inorganic phosphorous compounds, organic titanium compounds, organic zirconium compounds, and organic tin compounds.

Specific examples of the inorganic phosphorous compound include phosphor-containing acids such as phosphoric acid, pyrophosphoric acid, polyphosphoric acid, phosphorous acid, or hypophosphorous acid, alkali metal salts of phosphor-containing acids, and alkaline earth metal salts of phosphor-containing acids.

Examples of organic titanium compounds include titanium alkoxides (such as titanium tetrabutoxide or titanium tetraisopropoxide).

Examples of organic zirconium compounds include zirconium alkoxides (such as zirconium tetrabutoxide (also known as "Zr(OBu)$_4$" or "Zr(OC$_4$H$_8$)$_4$")).

Examples of organic tin compounds include distannoxane compounds (such as 1-hydroxy-3-isothiocyanate-1,1,3,3-tetrabutyldistannoxane), tin acetate, dibutyltin dilaurate, and butyltin hydroxide oxide hydrate.

There are no particular limitations to an amount of the added catalyst or the catalyst addition timing under a condition that the target product is obtained quickly.

Preferable examples of the thermoplastic polyamide-based elastomer include a combination of a ring-opening polycondensate of lauryl lactam/polyethylene glycol/adipic acid, a combination of a ring-opening polycondensate of lauryl lactam/polypropylene glycol/adipic acid, a combination of a ring-opening polycondensate of lauryl lactam/polytetramethylene ether glycol/adipic acid, a combination of a ring-opening polycondensate of lauryl lactam/ABA-type triblock polyether/adipic acid, a combination of a ring-opening polycondensate of lauryl lactam/ABA-type triblock polyether diamine/decane dicarboxylic acid, a combination of a ring-opening polycondensate of lauryl lactam/polyethylene glycol/decane dicarboxylic acid, a combination of a ring-opening polycondensate of lauryl lactam/polypropylene glycol/decane dicarboxylic acid, a combination of a ring-opening polycondensate of lauryl lactam/polytetramethylene ether glycol/decane dicarboxylic acid, a combination of a ring-opening polycondensate of lauryl lactam/ABA-type triblock polyether/decane dicarboxylic acid, a combination of a ring-opening polycondensate of lauryl lactam/ABA-type triblock polyether diamine/decane dicarboxylic acid, a combination of a polycondensate of aminododecanoic acid/polyethylene glycol/adipic acid, a combination of a polycondensate of aminododecanoic acid/polypropylene glycol/adipic acid, a combination of a polycondensate of aminododecanoic acid/polytetramethylene ether glycol/adipic acid, a combination of a polycondensate of aminododecanoic acid/ABA-type triblock polyether/adipic acid, a combination of a polycondensate of aminododecanoic acid/ABA-type triblock polyether diamine/adipic acid, a combination of a polycondensate of aminododecanoic acid/polyethylene glycol/decane dicarboxylic acid, a combination of a polycondensate of aminododecanoic acid/polypropylene glycol/decane dicarboxylic acid, a combination of a polycondensate of aminododecanoic acid/polytetramethylene ether glycol/decane dicarboxylic acid, a combination of a polycondensate of aminododecanoic acid/ABA-type triblock polyether/decane dicarboxylic acid, and a combination of a polycondensate of aminododecanoic acid/ABA-type triblock polyether diamine/decane dicarboxylic acid. Particularly preferable examples include a combination of a ring-opening polycondensate of lauryl lactam/ABA-type triblock polyether/adipic acid, a combination of a polycondensate of aminododecanoic acid/ABA-type triblock polyether/adipic acid, a combination of a polycondensate of aminododecanoic acid/ABA-type triblock polyether diamine/decane dicarboxylic acid, a combination of a polycondensate of aminododecanoic acid/polytetramethylene ether glycol/adipic acid, and a combination of a polycondensate of aminododecanoic acid/polytetramethylene ether glycol/decane dicarboxylic acid. Combinations of preferable configurations described above may be employed for the combinations of structural units, structural ratios, molecular weights, and the like of the thermoplastic polyamide-based elastomer.

Note that a species having a terminally bound carboxyl group or amino group is preferably employed as the thermoplastic polyamide-based elastomer in the present embodiment.

Silica

Silica is included in the resinous material. The silica not only refers to the narrow definition of silicon dioxide (SiO$_2$), but also encompasses silicic acid-based compounds, and other than silicic anhydride, this encompasses silicic acid hydrate, and silicates such as calcium silicate or aluminum silicate. The silica is not particularly limited, and a species employed in a commercial rubber composition may be employed. The aggregation state of the silica is not particularly limited and includes precipitated silica, silica gel, dry silica, colloidal silica, and the like. In the present embodiment, wet silica is preferably employed from viewpoints of, for example, wear resistance, ease-of-handling, the number of silanol groups at the surface, and the like.

An average particle diameter of the silica is not particularly limited and, from the viewpoint of dispersibility and tire strength, is preferably 100 nm or less and is more preferably 50 nm or less. Although the minimum for the average particle diameter of the silica is not particularly limited, 1 nm or greater is preferable and 10 nm or greater is more preferable. The average particle diameter of the silica represents an average particle diameter of the silica before reacting with the silane coupling agent. The average particle diameter of the silica can be measured by, for example, a laser diffraction particle size analyzer.

Although the BET specific surface area of the silica is not particularly limited, for example, from 10 m$^2$/g to 3000 m$^2$/g is preferable, and from 20 m$^2$/g to 2000 m$^2$/g is more preferable.

From the viewpoint of raising tire strength, and particularly cracking resistance, a content of the silica in the resinous material is preferably from 1 part by mass to 40 parts by mass, and is more preferably from 10 parts by mass to 30 parts by mass, with respect to 100 parts by mass of resin component. Here, the "resin component" refers to resins including thermoplastic resins and thermocurable resins included in the resinous material.

Silane Coupling Agent

The resinous material includes the silane coupling agent having a functional group that includes at least one selected from a nitrogen atom, a carboxyl group, an acid anhydride, or a ureido group. The silane coupling agent includes an Si atom, a functional group that is capable of chemically binding to an organic material, and a functional group that is capable of chemically binding to an inorganic material such as silica. In the present specification, the functional group that is capable of chemically binding to an organic material includes at least one of a nitrogen atom, a carboxyl group, an acid anhydride, or a ureido group. The silane coupling agent in the present embodiment has an advantageous effect of forming interfacial bonds between the thermoplastic polyamide-based elastomer and the silica, and the strength of the tire (particularly the cracking resistance) can be effectively improved by this advantageous effect. Note that although the ureido group is a type of group including a nitrogen atom, the ureido group is explained separately in the present specification.

In cases in which the functional group includes a nitrogen atom, the number of nitrogen atoms included in the functional group is not particularly limited and may be two or more. When the functional group is a group including a nitrogen atom, examples of the functional group include amino groups, substituted amino groups, isocyanurate groups, and isocyanate groups, and an amino group or a substituted amino group is preferable. For example, a group that dissociates and exhibits similar behavior to an amino group when the substituent interfacially binds to silica may be employed as the substituted amino group. Examples of the substituted amino group include groups in which a ketone has been dehydration condensed onto an amino group, or groups in which an amino group has been substituted by an alkyl group or aryl group. In cases in which the functional group that is capable of chemically binding to the organic material includes the amino group or the substituted amino group, a number of amino groups or the like is not particularly limited.

In cases in which the functional group includes a carboxyl group or an acid anhydride, a number of such groups included in the functional group is not particularly limited and may be two or more. Examples of the acid anhydride include carboxylic anhydride.

In cases in which the functional group includes the ureido group, a number of ureido groups included in the functional group is not particularly limited and may be two or more. The ureido group may be represented by a univalent $H_2NCONH-$ group obtained by removing one hydrogen atom from urea $(H_2N)_2CO$. Moreover, the ureido group may include a substituent.

The structure of the functional group that is capable of chemically binding to the organic material is not particularly limited, and a straight-chain-structure functional group may be selected from the viewpoint of reactivity. Moreover, the molecular weight of the functional group that is capable of chemically binding to the organic material is not particularly limited, and from the point of view of reactivity and the like, is preferably 100 or less, and is more preferably 70 or less.

The functional group that is capable of chemically binding to the inorganic material is not particularly limited as long as the functional group is capable of chemically binding to silica, and examples thereof include a methoxy group or an ethoxy group. From the viewpoint of environmental friendliness and ease-of-handling, the functional group that is capable of chemically binding to inorganic material is preferably an ethoxy group.

The silane coupling agent is not particularly limited as long as the silane coupling agent has a functional group including at least one selected from a nitrogen atom, a carboxyl group, an acid anhydride, or a ureido group. A commercial product may be employed as the silane coupling agent.

Examples of the silane coupling agent having a nitrogen atom included in a functional group include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, N-(vinylbenzyl)-2-aminoethyl-3-aminopropyltrimethoxysilane hydrochloride, tris-(trimethoxysilylpropyl)isocyanurate, and 3-isocyanate propyltriethoxysilane.

Examples of the silane coupling agent including a ureido group include 3-ureidopropyltriethoxysilane.

Examples of the silane coupling agent including a carboxyl group or an acid anhydride include trimethoxysilylpropyl succinic anhydride or triethoxysilylpropyl succinic anhydride. Of these silane coupling agents, 3-aminopropyltrimethoxysilane or 3-aminopropyltriethoxysilane can be suitably employed.

A content of the silane coupling agent in the resinous material can be appropriately chosen according to the type of silica to be employed and is not particularly limited. In this event, a specific surface area of the silica to be employed may serve as one indicator of the content choice for the silane coupling agent. For example, in cases in which the silica has a large specific surface area, the content of the silane coupling agent may be set greater than in cases in which the silica has a small specific surface area. A number of silanol groups of the silica surface may also serve as one indicator of the content choice for the silane coupling agent. For example, in cases in which wet silica is employed as the silica, the content of the silane coupling agent may be from 0.1 parts by mass to 20 parts by mass, is preferably from 0.1 parts by mass to 10 parts by mass, and is more preferably from 5 parts by mass to 10 parts by mass, with respect to 100 parts by mass of the silica.

A method of blending the silica and the silane coupling agent is not particularly limited, and a known blending method may be appropriately chosen and employed. Examples of the method of blending the silica and the silane coupling agent include a method of direcly treating the silica with the silane coupling agent by a dry method, a slurry method, a spray method, a gas phase reaction method or the like, and an integral blending method in which the thermoplastic polyamide-based elastomer and the silica are mixed by a biaxial mixing process while simultaneously adding the silane coupling agent.

Various additives other than the above silica and silane coupling agent, such as rubbers, various fillers (for example, calcium carbonate, or clays), antioxidants, oils, plasticizers, coloring agents, weather resistant agents, or reinforcing materials may be included in the resinous material if desired. A content of the additives in the resinous material (tire frame) is not particularly limited, and additives may be used as is appropriate within a range that does not impair the advantageous effects of the invention. In cases in which non-resinous components, such as additives, are added to the resinous material, a content of the resin component in the resinous material is preferably 50% by mass or greater, and is more preferably 90% by mass or greater, with respect to the total amount of resinous material. Note that the content of the resin component in the resinous material is the balance remaining after subtracting the total content of each additive from the total amount of the resin component.

Physical Properties of Resinous Material

Explanation next follows regarding preferable physical properties of the resinous material component of the tire frame. The tire frame employs the resinous material described above.

The melting temperature (or the softening temperature) of the resinous material (tire frame) itself is normally from 100° C. to 350° C. and is preferably approximately from 100° C. to 250° C., and from the viewpoint of tire manufacturability, the melting temperature is preferably approximately from 120° C. to 250° C. and more preferably from 120° C. to 200° C.

By thus employing resinous material with a melting temperature from 120° C. to 250° C., when, for example, forming the frame of the tire by fusing together body sections (frame pieces) thereof, sufficient weld strength is achieved between the tire frame pieces even for a frame fused together in a surrounding temperature range of from 120° C. to 250° C. The tire accordingly has excellent durability during running, such as puncture resistance performance, wear resistance, and the like. The heating temperature is preferably a temperature from 10° C. to 150° C. higher, and more preferably a temperature from 10° C. to 100° C. higher, than the melting temperature (or softening temperature) of the resinous material forming the tire frame pieces.

The resinous material may include various additives, if necessary, and may be obtained by appropriate mixing with a known method (for example, melt mixing).

Resinous material obtained by melt mixing may be employed in pellet form, if necessary.

The tensile yield strength, as defined by JIS K7113:1995, of the resinous material (tire frame) itself is preferably 5 MPa or greater, is preferably from 5 MPa to 20 MPa, and is more preferably from 5 MPa to 17 MPa. Setting the tensile yield strength of the resinous material at 5 MPa or greater enables deformation to be withstood for the loads imparted to the tire, such as during running.

The tensile yield elongation, as defined by JIS K7113:1995, of the resinous material (tire frame) itself is preferably 10% or greater, is preferably from 10% to 70%, and is more preferably from 15% to 60%. Setting the tensile yield elongation of the resinous material to 10% or greater enables a large elastic region and an excellent air seal to be achieved.

The tensile elongation at break, as defined by JIS K7113:1995, of the resinous material (tire frame) itself is preferably 50% or greater, is preferably 100% or greater, is more preferably 150% or greater, and is particularly preferably 200% or greater. Setting the tensile elongation at break of the resinous material to 50% or greater enables excellent fittability onto a rim to be achieved and enables low susceptibility to impact damage.

The deflection temperature under load (at 0.45 MPa during loading), as defined by ISO75-2 or ASTM D648, of the resinous material (tire frame) itself is preferably 50° C. or above, is preferably from 50° C. to 150° C., and is more preferably from 50° C. to 130° C. Setting the deflection temperature under load of the resinous material at 50° C. or above enables deformation of the tire frame to be suppressed even in cases in which vulcanization is performed during manufacture of the tire.

First Embodiment

Explanation follows regarding a tire according to a first embodiment of the present invention, with reference to the drawings.

Figure 1A:
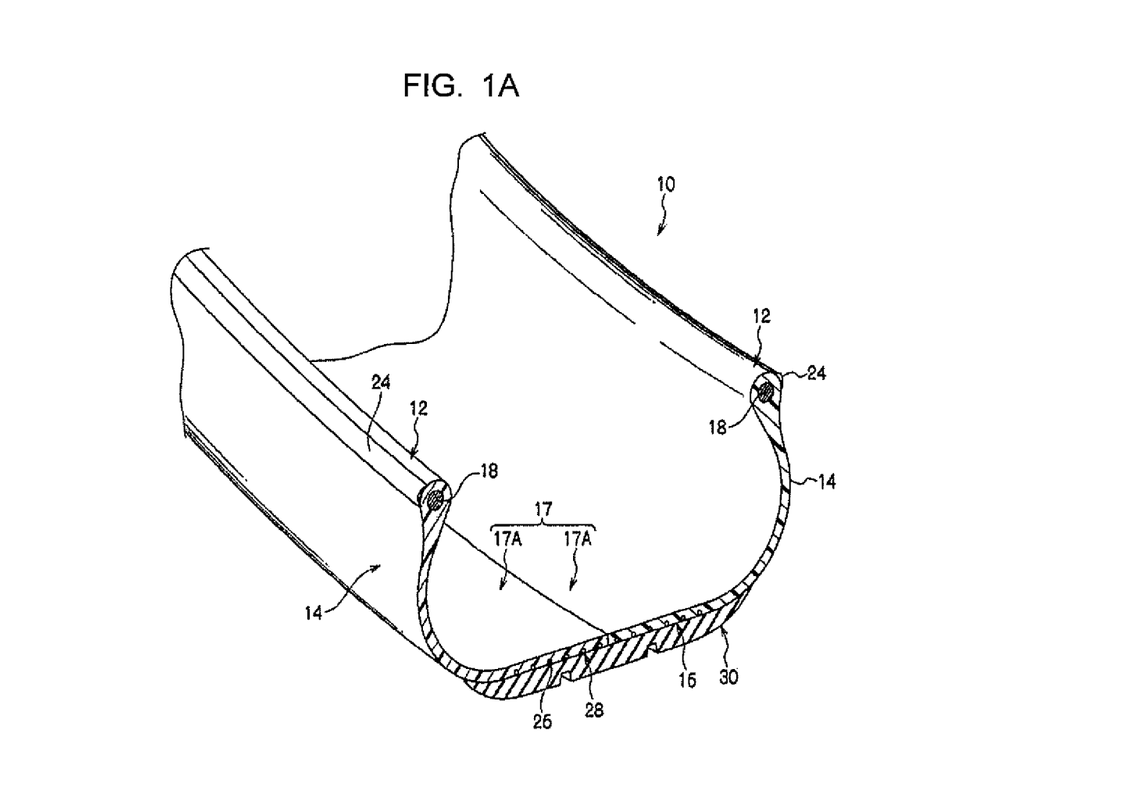
FIG. 1A is a perspective view illustrating a cross-section of a portion of a tire according to one embodiment of the invention.
Figure 1B:
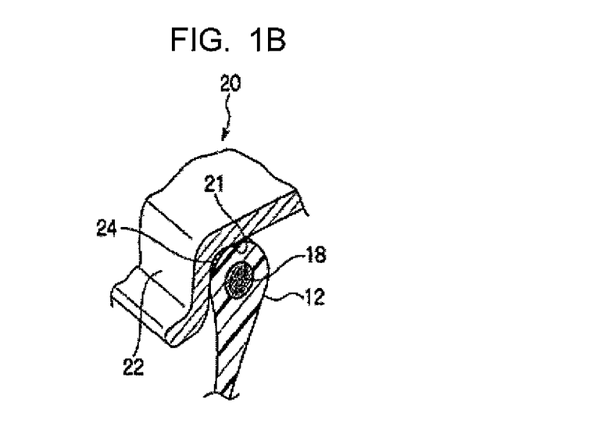
FIG. 1B is a cross-section view of a bead portion fitted to a rim.

Explanation follows regarding a tire 10 of the present embodiment. FIG. 1A is a perspective view illustrating a cross-section of a part of the tire according to one embodiment of the present invention. FIG. 1B is a cross-section of a bead portion fitted to a rim. As illustrated in FIG. 1, the tire 10 according to the present embodiment has a cross-section profile substantially similar to that of conventional, ordinary rubber-made pneumatic tires.

As illustrated in FIG. 1A, the tire 10 is equipped with a tire case 17 (tire frame) configured including a pair of bead portions 12 that each make contact with a bead seat 21 and a rim flange 22 of the rim 20 illustrated in FIG. 1B, side portions 14 that respectively extend from the bead portions 12 toward the tire radial direction outside, and a crown portion 16 (outer circumference portion) that connects together the tire radial direction outside end of one side portion 14 and the tire radial direction outside end of the other side portion 14.

Here, as the tire case 17 of the present embodiment, one that has the thermoplastic polyamide-based elastomer with which silica and the silane coupling agent in the present invention are incorporated can be employed.

Although the tire case 17 of the present embodiment is formed of a single resinous material, the present invention is not limited to this configuration. Similarly to in conventional ordinary rubber-made pneumatic tires, the thermoplastic resinous materials having different properties may be used for each location (such as the side portions 14, the crown portion 16, and the bead portions 12) of the tire case 17. Moreover, a reinforcing material (such as a polymer, a metal fiber, a cord, a non-woven fabric, or a woven fabric) may be embedded into the tire case 17 (for example, in the bead portions 12, the side portions 14, the crown portion 16, or the like) so that the tire case 17 may be reinforced by the reinforcing material.

In the tire case 17 of the present embodiment, a pair of tire case halves (tire frame pieces) 17A formed of a resinous material are joined together. The tire case halves 17A are each molded as a single body of one of the bead portions 12, one of the side portions 14, and half the width of the crown portion 16, by injection molding or the like, to give tire case halves 17A of the same circular shape as each other that are then aligned to face each other and joined together at tire equatorial plane portions. Note that the tire case 17 is not limited to being formed by joining two members, and may be formed by joining three or more members.

The tire case halves 17A formed with the resinous material may, for example, be molded by vacuum molding, pressure molding, injection molding, melt casting, or the like. The need to perform vulcanization is therefore eliminated in contrast to conventional cases in which a tire case is molded of rubber, enabling tire manufacturing processes to be greatly simplified, and enabling molding time to be reduced.

In the present embodiment, the tire case halves 17A are formed in left-right symmetrical shapes, namely, one of the tire case halves 17A is formed in the same shape as the other of the tire case halves 17A, with the advantage that one type of mold suffices for molding the tire case halves 17A.

In the present embodiment, as illustrated in FIG. 1B, an annular bead core 18, formed of steel cord, is embedded in each of the bead portions 12, similarly to in ordinary conventional pneumatic tires. However, the invention is not limited to such a configuration, and the bead core 18 may be omitted as long as the rigidity of the bead portions 12 is secured, and there are no issues with fitting the bead portions 12 to the rim 20. Other than steel cord, the bead core 18 may also be formed of, for example, organic fiber cord, organic fiber cord covered in a resin, or a hard resin.

In the present embodiment, a seal layer 24, that is formed in an annular shape from a material with more excellent sealing properties than the resinous material component of the tire case 17, for example, rubber, is formed at portions of the bead portions 12 that contact the rim 20 and at least at portions of the rim 20 that contact the rim flange 22. The seal layer 24 may also be formed to portions where the tire case 17 (the bead portions 12) and the bead seats 21 contact each other. A softer material than the resinous material component of the tire case 17 may be employed as the material with more excellent sealing properties than the resinous material component of the tire case 17. As a rubber capable of being employed as the seal layer 24, preferably the same type of rubber is employed as a rubber employed on bead portion external faces of ordinary conventional rubber-made pneumatic tires. Another thermoplastic resin (thermoplastic elastomer) with more excellent sealing properties than the resinous material may also be employed. Examples of such other thermoplastic resins include resins such as polyurethane-based resins, polyolefin-based resins, thermoplastic polystyrene-based resins, or polyester resins, and blends of these resins and a rubber or elastomer. A thermoplastic elastomer may also be employed, and examples thereof include thermoplastic polyester-based elastomers, thermoplastic polyurethane-based elastomers, thermoplastic polystyrene-based elastomers, thermoplastic polyolefin-based elastomers, combinations of such elastomers with each other, and blends of such elastomers with rubber.

As illustrated in FIG. 1A, a reinforcing cord 26 having higher rigidity than the resinous material component of the tire case 17 is wound onto the crown portion 16 in the tire case 17 circumferential direction. The reinforcing cord 26 is wound in a helical shape, such that at least a portion thereof is in an embedded state in the crown portion 16 in cross-section taken along the tire case 17 axial direction, to form a reinforcing cord layer 28. The crown 30, formed of a material, for example rubber, having more excellent wear resistance than the resinous material component of the tire case 17, is disposed to the tire radial direction outer circumferential side of the reinforcing cord layer 28.

Figure 2:
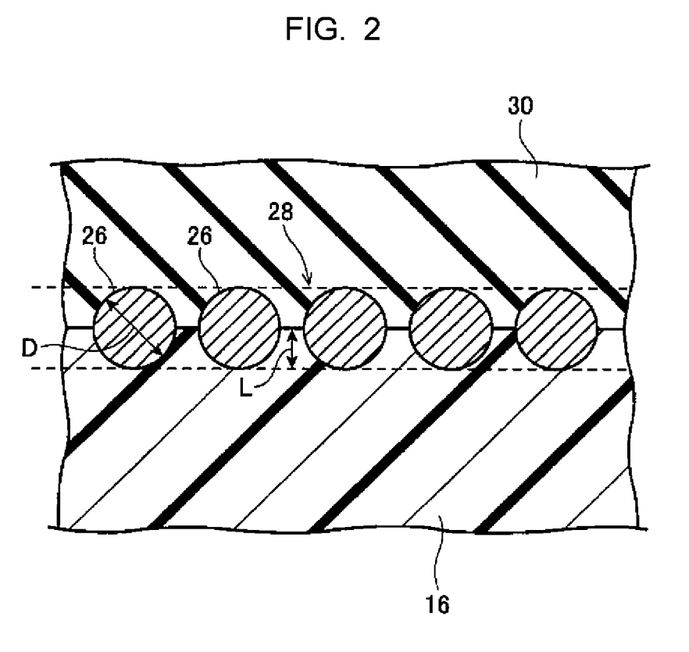
FIG. 2 is a cross-section taken along a tire rotation axis and illustrating a state in which a reinforcing cord is embedded in a crown portion of a tire case of a tire of the first embodiment.

Explanation follows regarding the reinforcing cord layer 28 formed by the reinforcing cord 26, with reference to FIG. 2. FIG. 2 is a cross-section taken along the tire rotation axis and illustrating a state in which reinforcing cord is embedded in the crown portion of a tire case of a tire of the first embodiment. As illustrated in FIG. 2, the reinforcing cord 26 is wound in a helical shape such that, in cross-section taken along the tire case 17 axial direction, at least a portion is in a state embedded in the crown portion 16, to form, together with a portion of the outer circumference portion of the tire case 17, a reinforcing cord layer 28 as illustrated by the intermittent line portion in FIG. 2. The portion of the reinforcing cord 26 embedded in the crown portion 16 is in a close contact state with the resinous material component of the crown portion 16 (the tire case 17). As the reinforcing cord 26, a monofilament (single strand) such as of metal fiber or organic fiber, or a multifilament (twisted strands) formed of twisted fibers such as a steel cord formed of twisted steel fiber, or the like may be employed. In the present embodiment, a steel cord is employed as the reinforcing cord 26.

The embedding depth L in FIG. 2 illustrates an embedding depth of the reinforcing cord 26 with respect to the tire case 17 (the crown portion 16) along the tire rotation axis direction. The embedding depth L of the reinforcing cord 26 with respect to the crown portion 16 is preferably ⅕ of the diameter D of the reinforcing cord 26 or greater, and more preferably exceeds ½ thereof. It is most preferable that the entirety of the reinforcing cord 26 is embedded in the crown portion 16. From a dimensional perspective of the reinforcing cord 26, setting the embedding depth L of the reinforcing cord 26 to exceed ½ the diameter D of the reinforcing cord 26 makes it difficult for the reinforcing cord 26 to come away from the embedded portion. Embedding the entirety of the reinforcing cord 26 in the crown portion 16 makes a surface (outer circumferential surface) to be flat, and enables air to be suppressed from becoming incorporated at reinforcing cord peripheral portions even in a case in which a member is placed on the crown portion 16 embedded with the reinforcing cord 26. The reinforcing cord layer 28 corresponds to a belt disposed on the outer circumferential surface of a carcass of a conventional rubber-made pneumatic tire.

As described above, the crown 30 is disposed at the tire radial direction outer circumferential side of the reinforcing cord layer 28. The rubber employed in the crown 30 is preferably the same type of rubber to a rubber employed in a conventional rubber-made pneumatic tire. In place of the crown 30, a crown formed of another type of resinous material with more excellent wear resistance than the resinous material component of the tire case 17 may be employed. The crown 30 is formed with a crown pattern formed of plural grooves in the road contact face that contacts the road surface, similarly to in a conventional rubber-made pneumatic tire.

Explanation follows regarding a manufacturing method of a tire according to the present embodiment.

Tire Case Forming Process

First, a tire case half is formed using the resinous material including the thermoplastic polyamide-based elastomer described above. The forming of the tire case is preferably performed by injection molding. Then, tire case halves supported by a thin metal support ring are aligned with each other. Then placement is made in a jointing mold, not illustrated in the drawings, such that outer circumferential surfaces of the abutting portions of the tire case halves make contact. The jointing mold is configured to press the periphery of the joining portion (the abutting portion) of the tire case halves 17A with a specific pressure. Then the periphery of the joining portion of the tire case halves is pressed at the melting temperature (or softening temperature) of the resinous material component of the tire case, or higher. When the joining portion of the tire case halves is heated and pressed by the jointing mold, the joining portion melts and the tire case halves are fused together, and these members are formed into a single body of the tire case 17. Note that although in the present embodiment the joining portion of the tire case halves is heated by using the jointing mold, the invention is not limited thereto. For example, to join the tire case halves, the joining portions may be heated by a separately provided high-frequency heater or the like, or may be pre-softened or melted by using hot air, irradiation with infrared radiation, or the like, and then pressed by the jointing mold.

Reinforcing Cord Member Winding Process

Figure 3:
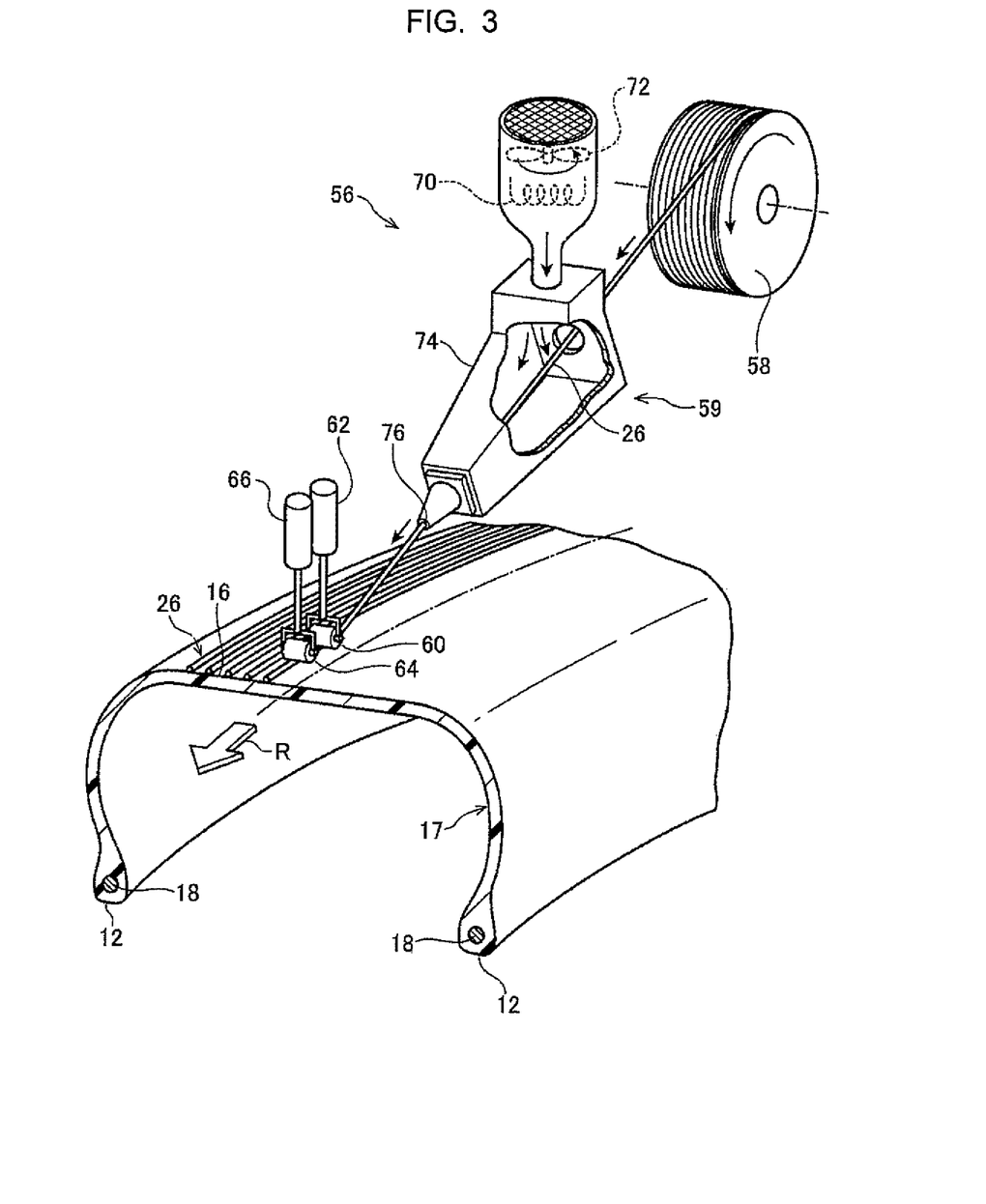
FIG. 3 is an explanatory diagram to explain an operation to embed a reinforcing cord in a crown portion of a tire case using a cord heating device and rollers.

Explanation next follows regarding a reinforcing cord winding process, with reference to FIG. 3. FIG. 3 is an explanatory diagram to explain an operation to embed the reinforcing cord in the crown portion of a tire case using a cord heating device and rollers. In FIG. 3, a cord supply device 56 is equipped with: a reel 58 wound with reinforcing cord 26; a cord heating device 59 disposed at the cord conveying direction downstream side of the reel 58; a first roller 60 disposed at the reinforcing cord 26 conveying direction downstream side; a first cylinder device 62 to move the first roller 60 in a direction towards, or away from, the tire outer circumferential surface; a second roller 64 disposed at the reinforcing cord 26 conveying direction downstream side of the first roller 60; and a second cylinder device 66 to move the second roller 64 in a direction towards, or away from, the tire outer circumferential surface. The second roller 64 may be employed as a cooling roller made of metal. In the present embodiment, the surface of the first roller 60 or the second roller 64 is coated with a fluororesin (TEFLON (registered trademark) in the present embodiment) to suppress adhering of the melted or softened resinous material. In the present embodiment, the cord supply device 56 is configured including the two rollers, the first roller 60 or the second roller 64; however, the invention is not limited to such a configuration and may be configured including one of the rollers alone (namely, a single roller).

The cord heating device 59 is equipped with a heater 70 and a fan 72 for generating hot air. The cord heating device 59 is also equipped with a heating box 74 that is supplied inside with hot air and through an interior space of which the reinforcing cord 26 passes, and a discharge outlet 76 that dispenses the heated reinforcing cord 26.

In the present process, first, the temperature of the heater 70 is raised in the cord heating device 59, and the surrounding air heated by the heater 70 is formed into an airflow by rotation of the fan 72 and delivered into the heating box 74. The reinforcing cord 26 unwound from the reel 58 is then fed into the heating box 74, the internal space of which has been heated by the hot airflow, and heated (for example, the reinforcing cord 26 is heated to a temperature of approximately 100° C. to 200° C.). The heated reinforcing cord 26 passes through the discharge outlet 76 and is wound under a constant tension in a helical shape on the outer circumferential surface of the crown portion 16 of the tire case 17 rotating in the arrow R direction in FIG. 3. When the heated reinforcing cord 26 contacts the outer circumferential surface of the crown portion 16, the resinous material of the contact portion melts or softens, and at least a portion of the heated reinforcing cord 26 is embedded in the outer circumferential surface of the crown portion 16. When this is performed, due to the heated reinforcing cord 26 being embedded in the melted or softened resinous material, a state is achieved in which there are no gaps between the resinous material and the reinforcing cord 26, namely, a close contact state. Air is thereby suppressed from being incorporated into the portion where the reinforcing cord 26 is embedded. Heating the reinforcing cord 26 to a higher temperature than the melting temperature (or softening temperature) of the resinous material component of the tire case 17 promotes melting or softening of the resinous material at the portion contacted by the reinforcing cord 26. This thereby enables the reinforcing cord 26 to be readily embedded in the outer circumferential surface of the crown portion 16, and enables the incorporation of air to be effectively suppressed.

The embedding depth L of the reinforcing cord 26 can be adjusted using the heating temperature of the reinforcing cord 26, the tension acting on the reinforcing cord 26, the pressure of the first roller 60, and the like. In the present embodiment, the embedding depth L of the reinforcing cord 26 is set to be ⅕ of the diameter D of the reinforcing cord 26 or greater. The embedding depth L of the reinforcing cord 26 more preferably exceeds ½ the diameter D of the reinforcing cord 26, and most preferably the entirety of the reinforcing cord 26 is embedded.

By winding the heated reinforcing cord 26 while embedding the reinforcing cord 26 in the outer circumferential surface of the crown portion 16, the reinforcing cord layer 28 is formed at the outer circumferential side of the crown portion 16 of the tire case 17.

Then, a vulcanized, belt-shaped crown 30 is wound a single turn around the outer circumferential surface of the tire case 17, and the crown 30 is bonded to the outer circumferential surface of the tire case 17 with a bonding agent or the like. Note that the crown 30 may be, for example, a pre-cured crown employed in conventional known recycled tires. The present process is a similar process to the process for bonding a pre-cured crown to the outer circumferential surface of a casing of a recycled tire.

Bonding the seal layers 24, which are formed of a vulcanized rubber, to the bead portions 12 of the tire case 17 with a bonding agent or the like thereby completes the tire 10.

Effects

In the tire 10 of the present embodiment, the tire case 17 is formed by the resinous material that includes the thermoplastic polyamide-based elastomer, the silica, and the silane coupling agent in the present invention, thereby enabling the strength of the tire (cracking resistance in particular) to be improved. Moreover, the tire 10 has a simpler structure than conventional rubber-made tires and is therefore lighter in weight. The tire 10 of the present embodiment therefore has high wear resistance and durability. The tire case 17 is moreover capable of being injection molded, and so has exceptionally good productivity.

In the tire 10 of the present embodiment, the puncture resistance performance, cut resistance performance, and the circumferential direction rigidity of the tire 10 are improved due to winding the reinforcing cord 26, which has a higher rigidity than the resinous material, onto the outer circumferential surface of the crown portion 16 of the tire case 17 formed of the resinous material, so as to give a helical shape around the circumferential direction. Raising the circumferential direction rigidity of the tire 10 prevents creep of the tire case 17 formed of the resinous material.

Due to at least a portion of the reinforcing cord 26 being embedded in and in close contact with the resinous material in the outer circumferential surface of the crown portion 16 of the resinous material-formed tire case 17 in a cross-section taken along the axial direction of the tire case 17 (the cross-section illustrated in FIG. 1A), air is suppressed from being incorporated during manufacture, and the reinforcing cord 26 is suppressed from moving under force input during running, or the like. Occurrence of delamination or the like of the reinforcing cord 26, the tire case 17, and the crown 30 is thereby suppressed, improving the durability of the tire 10.

In cases in which the reinforcing cord layer 28 is formed including a resinous material, the difference in hardness between the tire case 17 and the reinforcing cord layer 28 can be reduced, and the reinforcing cord 26 can be thereby placed in closer contact and/or better fixed to the tire case 17, comparing with cases in which the reinforcing cord 26 is fixed thereto with cushion rubber. This thereby enables the incorporation of air described above to be effectively prevented, enabling movement of the reinforcing cord member during running to be effectively suppressed.

Moreover, cases in which the reinforcing cord 26 is steel cord enable easy separation and/or recovery of the reinforcing cord 26 from the resinous material by heating the reinforcing cord 26 when disposing of the tire, with this being advantageous from the perspective of recycling characteristics of the tire 10. The loss coefficient (tan δ) of resinous material is also lower than that of vulcanized rubber, enabling the tire rolling characteristics to be improved when the reinforcing cord layer 28 includes a lot of resinous material. Moreover, the in-plane shear rigidity of resinous material is larger than that of vulcanized rubber, with the advantages of excellent steering stability during tire running and wear resistance.

As illustrated in FIG. 2, the embedding depth L of the reinforcing cord 26 is ⅕ of the diameter D or greater, and so the incorporation of air during manufacture is effectively suppressed, further suppressing the reinforcing cord 26 from moving under force input or the like during running.

The crown 30 that contacts the road surface has as its component a rubber material that has greater wear resistance than the resinous material component of the tire case 17, accordingly improving the wear resistance of the tire 10.

Moreover, the annular bead cores 18 formed of a metal material are embedded in the bead portions 12, and so similarly to a conventional rubber-made pneumatic tire, the tire case 17, namely the tire 10, is firmly retained on the rim 20.

The seal layers 24, which are formed of a rubber material having better sealing properties than the resinous material component of the tire case 17, are provided to a portion of the bead portions 12 that is in contact with the rim 20, thereby enabling the fittability onto a rim for the tire 10 and the rim 20 to be further improved.

The above embodiment is configured by heating the reinforcing cord 26, with the surface of the tire case 17 melting or softening at the portions where the heated reinforcing cord 26 makes contact therewith; however, the invention is not limited to such a configuration, and the reinforcing cord 26 may be embedded in the crown portion 16 after using a hot airflow generation device to heat the outer circumferential surface of the crown portion 16 where the reinforcing cord 26 is to be embedded, without heating the reinforcing cord 26.

In the first embodiment, the heat source of the cord heating device 59 is a heater and a fan; however, the invention is not limited to such a configuration, and configuration may be made to directly heat the reinforcing cord 26 with radiation heat (such as, for example, by infrared radiation).

The first embodiment is configured such that the portion of the resinous material melted or softened where the reinforcing cord 26 is embedded is force-cooled with the metal second roller 64; however, the invention is not limited to such a configuration, and configuration may be made such that a cooling airflow is blown directly onto the portion of the resinous material that has been melted or softened, thereby force-cooling and solidifying the melted or softened portion of the resinous material.

The first embodiment is configured such that the reinforcing cord 26 is heated; however, for example, configuration may be made such that the outer periphery of the reinforcing cord 26 is covered by the same resinous material as that of tire case 17. In such cases, by heating the reinforcing cord 26 together with the covering resinous material when winding covered reinforcing cord onto the crown portion 16 of the tire case 17, air incorporation during embedding in the crown portion 16 can be effectively suppressed.

Winding the reinforcing cord 26 in a helical shape facilitates manufacture; however, other methods, such as in which the reinforcing cord 26 is discontinuous in the width direction, may also be considered.

In the tire 10 of the first embodiment, the bead portions 12 are fitted to the rim 20 so as to form an air chamber between the tire 10 and the rim 20, in what is referred to as a tubeless tire; however, the invention is not limited to such a configuration, and may be formed into a complete tube shape. Moreover, the tire of the present invention may employ a reinforcing cord member, with the cord member being covered by a resinous material as described by the second embodiment (FIG. 4 and FIG. 5) of JP-A No. 2012-46030.

Although the first embodiment was given as an example of an embodiment of the present invention, this embodiments is merely exemplary, and various modifications may be implemented within a range not departing from the spirit of the invention. Obviously the scope of rights of the invention is not limited to these embodiments.

EXAMPLES

More specific explanation regarding the invention is given below based on Examples. However, the invention is not limited thereto.

Examples and Comparative Examples

In each example and comparative example, a resinous material including a thermoplastic polyamide-based elastomer (product name "XPA9048" manufactured by Ube Industries, Ltd.), a filler (silica) (product name "NIPSIL AQ" manufactured by Tosoh Silica Corporation), and the silane coupling agent listed in Table 1 below (Shin-Etsu Chemical Co., Ltd.) was pre-mixed using a biaxial kneader (a kneader that is trade name: LABOPLASTMILL (model number: 10C100) connected to a small-scale biaxial segment extruder (model number: 2D15W), manufactured by Toyo Seiki Seisaku-Sho, Ltd.), and then the resin sheet of each example and comparative example was produced at a size of 30 mm×100 mm×2 mm using an injection mold. When this was performed, the blending ratio of the resinous material was 100 parts thermoplastic polyamide-based elastomer, 20 parts silica, and 2 parts silane coupling agent.

Tire Strength: Cracking Resistance Test

A dumbbell number 3 shape, defined by JISK K 6251: 2010, was cut out of the obtained resin sheet, and a test sample with a crack origin point already introduced at the center was produced. The test sample was cyclically tension loaded using a servo pulser (manufactured by Shimadzu Corp., trade name: SERVO PULSER), and the number of endurance cycles until the crack developed and the test sample broke was recorded. When this was performed, the endurance number for each example and comparative example was evaluated as follows with the endurance number of Comparative Example 1 (no silane coupling agent employed) in Table 1 below as a reference value. Note that the evaluation of Comparative Example 1 was included as "B".

A: The number of endurance cycles was 1,000,000 cycles or more above the reference value.
B: The number of endurance cycles was equal to or more than 0, but less than 1,000,000, above the reference value.
C: The number of endurance cycles was less than the reference value.

TABLE 1

|  | Silane coupling agent | | Cracking resistance test |
| --- | --- | --- | --- |
| Example 1 | Amino group-containing | N-2-(aminoethyl)-3-amino-propyltrimethoxysilane | A |
| Comparative Example 1 | Not blended with silane coupling agent | | B |

As is apparent from the results of Table 1, it was clear that Examples blended with the silane coupling agent in the invention had superior tire strengths (cracking resistance) compared to Comparative example that was not blended with the silane coupling agent and Comparative examples of a mercapto group-containing or sulfide group-containing silane coupling agent, which is employed in conventional rubber compositions, blended with a resinous material including a thermoplastic polyamide-based elastomer and silica.

The disclosure of Japanese Patent Application No. 2014-218405, filed on Oct. 27, 2014, is incorporated in its entirety by reference herein.

All cited documents, patent applications, and technical standards mentioned in the present specification are incorporated by reference in the present specification to the same extent as if the individual cited document, patent application, or technical standard was specifically and individually indicated to be incorporated by reference.

The invention claimed is:

1. A tire comprising a tire frame that is formed of a resinous material and has a circular form, the resinous material comprising:
a thermoplastic polyamide-based elastomer;
silica; and
a silane coupling agent that has a functional group, the functional group comprising at least one selected from the group consisting of a nitrogen atom, a carboxyl group, an acid anhydride, and a ureido group;
wherein a content of the thermoplastic polyamide-based elastomer is 70% by mass or greater with respect to a total amount of the resinous material.

2. The tire of claim 1, wherein the functional group comprises an amino group or a substituted amino group.

3. The tire of claim 1, wherein a content of the silica in the resinous material is from 1 part by mass to 40 parts by mass with respect to 100 parts by mass of a resin component that includes the thermoplastic polyamide-based elastomer.

4. The tire of claim 1, wherein a content of the silane coupling agent in the resinous material is from 0.1 parts by mass to 20 parts by mass with respect to 100 parts by mass of the silica.

5. The tire of claim 1, wherein the silane coupling agent is selected from the group consisting of N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, N-(vinylbenzyl)-2-aminoethyl-3-aminopropyltrimethoxysilane hydrochloride, tris-(trimethoxysilylpropyl)isocyanurate, 3-isocyanate propyltriethoxysilane, 3-ureidopropyltriethoxysilane, trimethoxysilylpropyl succinic anhydride, and triethoxysilylpropyl succinic anhydride.

6. The tire of claim 1, wherein an average particle diameter of the silica is 100 nm or less.

7. The tire of claim 1, wherein a BET specific surface area of the silica is from 10 $m^2/g$ to 3000 $m^2/g$.

* * * * *